US010762543B2

(12) United States Patent
Lamberton

(10) Patent No.: US 10,762,543 B2
(45) Date of Patent: Sep. 1, 2020

(54) DATA SECURITY SYSTEM AND METHOD

(71) Applicant: JEWEL AVIATION AND TECHNOLOGY LIMITED, Middlesex (GB)

(72) Inventor: Christopher Anthony Lamberton, Middlesex (GB)

(73) Assignee: JEWEL AVIATION AND TECHNOLOGY LIMITED, Middlesex (GB)

( * ) Notice: Subject to any disclaimer, the term of this patent is extended or adjusted under 35 U.S.C. 154(b) by 194 days.

(21) Appl. No.: 15/503,397

(22) PCT Filed: Aug. 11, 2015

(86) PCT No.: PCT/GB2015/000234
§ 371 (c)(1),
(2) Date: Feb. 12, 2017

(87) PCT Pub. No.: WO2016/024076
PCT Pub. Date: Feb. 18, 2016

(65) Prior Publication Data
US 2017/0243267 A1    Aug. 24, 2017

(30) Foreign Application Priority Data

Aug. 12, 2014   (GB) .................................. 1414302.8

(51) Int. Cl.
*G06Q 30/06* (2012.01)
*G06F 21/60* (2013.01)
(Continued)

(52) U.S. Cl.
CPC ......... *G06Q 30/0609* (2013.01); *G06F 21/60* (2013.01); *G06F 21/6218* (2013.01);
(Continued)

(58) Field of Classification Search
CPC .. G06Q 30/0609; G06Q 20/202; G06Q 30/00; G06Q 2220/00; G06F 21/60;
(Continued)

(56) References Cited

U.S. PATENT DOCUMENTS 6,856,975 B1 *   2/2005   Inglis .................... G06Q 20/02
                                                                705/40
7,225,249 B1 *   5/2007   Barry .................... H04L 41/18
                                                               709/227

(Continued)

FOREIGN PATENT DOCUMENTS

EP          2 099 155 A1    9/2009
WO          03/049359 A1    6/2003
WO          2013/072177 A1  5/2013

OTHER PUBLICATIONS

International Search Report issued in connection with corresponding International Application No. PCT/GB2015/000234 dated Oct. 23, 2015 (3 pages total).

(Continued)

*Primary Examiner* — Peter Ludwig
*Assistant Examiner* — Michael Jared Walker
(74) *Attorney, Agent, or Firm* — John Maldjian; Maldjian Law Group LLC

(57) ABSTRACT

A system and method are disclosed for secure storage of customer's public and private data in a personal data store. Companies communicate with a secure data storage server using a public encryption key linked to a registered IP Address, customers communicate with a private encryption key, and encrypted data can be stored using a variety of encryption keys. The personal data store can be used for preparing customer product views, linking personal data to avoid repeated customer data entries, customer identification and loyalty card linking. Encrypted stored data ensures no other person can read it.

26 Claims, 6 Drawing Sheets

(51) Int. Cl.
  *H04L 29/06* (2006.01)
  *G06F 21/62* (2013.01)
  *G06Q 20/20* (2012.01)
  *H04L 9/14* (2006.01)
  *H04L 9/32* (2006.01)

(52) U.S. Cl.
  CPC ............ *G06Q 20/202* (2013.01); *H04L 9/14* (2013.01); *H04L 9/3226* (2013.01); *H04L 63/0478* (2013.01); *G06Q 2220/00* (2013.01); *H04L 2209/56* (2013.01)

(58) Field of Classification Search
  CPC ..... G06F 21/6218; H04L 9/14; H04L 9/3226; H04L 63/0478; H04L 2209/56
  See application file for complete search history.

(56) References Cited

U.S. PATENT DOCUMENTS

| | | | | |
|---|---|---|---|---|
| 7,254,569 | B2* | 8/2007 | Goodman | G06F 17/243 |
| 7,793,141 | B1* | 9/2010 | Miller | G06F 11/0709 |
| | | | | 714/4.4 |
| 7,832,646 | B1* | 11/2010 | Leason | G06Q 20/102 |
| | | | | 235/492 |
| 8,924,724 | B2* | 12/2014 | Johnson | G06F 21/62 |
| | | | | 370/352 |
| 2003/0158960 | A1* | 8/2003 | Engberg | G06Q 20/02 |
| | | | | 709/237 |
| 2003/0226024 | A1* | 12/2003 | Sweets | H04L 63/0428 |
| | | | | 713/193 |
| 2004/0030887 | A1* | 2/2004 | Harrisville-Wolff | |
| | | | | H04L 63/0442 |
| | | | | 713/155 |
| 2004/0064351 | A1* | 4/2004 | Mikurak | G06Q 10/087 |
| | | | | 705/22 |
| 2006/0004674 | A1* | 1/2006 | Tesser | G06Q 20/206 |
| | | | | 705/74 |
| 2006/0229959 | A1* | 10/2006 | Heidingsfeld | G06Q 40/00 |
| | | | | 705/35 |
| 2007/0106892 | A1* | 5/2007 | Engberg | G06Q 20/02 |
| | | | | 713/168 |
| 2007/0204329 | A1* | 8/2007 | Peckover | G06F 21/10 |
| | | | | 726/3 |
| 2008/0152149 | A1* | 6/2008 | Bauchot | H04L 12/189 |
| | | | | 380/279 |
| 2008/0228867 | A1* | 9/2008 | Murphy | G06F 21/305 |
| | | | | 709/203 |
| 2009/0132813 | A1* | 5/2009 | Schibuk | G06Q 20/223 |
| | | | | 713/158 |
| 2010/0228987 | A1* | 9/2010 | Dinov | G06F 21/41 |
| | | | | 713/183 |
| 2011/0010340 | A1* | 1/2011 | Hung | H04L 12/1886 |
| | | | | 707/623 |
| 2011/0153512 | A1* | 6/2011 | Peckover | G06F 21/10 |
| | | | | 705/318 |
| 2013/0111217 | A1* | 5/2013 | Kopasz | G06F 21/6245 |
| | | | | 713/189 |
| 2013/0159699 | A1* | 6/2013 | Torkkel | G06F 21/6245 |
| | | | | 713/155 |
| 2013/0208893 | A1* | 8/2013 | Shablygin | H04L 9/0822 |
| | | | | 380/277 |
| 2014/0164777 | A1* | 6/2014 | Wielopolski | H04L 9/0866 |
| | | | | 713/171 |
| 2014/0164790 | A1* | 6/2014 | Dodgson | G06Q 10/10 |
| | | | | 713/193 |
| 2014/0201331 | A1* | 7/2014 | Kershaw | H04W 4/185 |
| | | | | 709/219 |
| 2015/0161350 | A1* | 6/2015 | Chang | H04W 4/80 |
| | | | | 705/3 |

OTHER PUBLICATIONS

Written Opinion issued in connection with corresponding International Application No. PCT/GB2015/000234 dated Oct. 23, 2015 (7 pages total).

\* cited by examiner

DATA SECURITY SYSTEM AND METHOD

CROSS-REFERENCE TO RELATED APPLICATIONS

This application claims the benefit under 35 U.S.C. § 371 of International Application PCT/GB2015/000234 filed on Aug. 11, 2015, which in turn claims the benefit of Great Britain application GB1414302.8 filed on Aug. 12, 2014, the entire content of each of which is hereby incorporated by reference in its entirety.

FIELD

The present invention relates to secure data storage and access in the area of Internet and other network access. The invention particularly relates to sensitive data which would, for example, be useful to those who exploit virus infections and other forms of malware to steal or otherwise exploit individual data. The invention further relates to making personal data available for legitimate use while all the time ensuring data security.

BACKGROUND

United States Patent Application US2014164790 (A1) discloses methods and systems for administrative management of a secure data storage network are disclosed. One system includes a secure storage appliance configured to host a plurality of volumes, each volume associated with a plurality of shares stored on a corresponding plurality of physical storage devices and having a plurality of volume management settings, wherein each volume is accessible by a group of one or more users, each user assigned an administrative access level, the volume management settings are editable by a first user from the group of one or more users associated with the volume and assigned an administrative access level sufficient to edit the volume management settings, and the volume management settings are inaccessible by a second user from outside the group of one or more users associated with the volume and assigned an administrative access level at least equal to that of the first user. The present invention seeks to provide improvement there over by providing greatly simplified data protection arrangements while allowing free and a varied access without risk of information divulgence.

United States Patent Application US2014164777 (A1) discloses a remote device secure data file storage system and method of securely storing data files at a remote device, includes a host system having a database and a plurality of remote devices, each connected with the host system by a communication network. Each remote device and the host system is programmed with a time-based cryptography system that generates an encryption key (RVK) and initialization vector (IV) for encrypting and decrypting data on the remote device. The time-based cryptography system generates the encryption key (RVK) as a function of a parameter (PDPT) that is a function of a personal date (PD) and personal time (PT) of the user. The personal date and personal time of the user being a function of personal data entered by the user on the remote device. The personal date (PD) is a function of the date of birth (DOB) of the user and the personal time (PT) is a function of the time of birth (TOB) of the user. The present invention seeks to provide improvement there over by simplifying the selection of keys whilst at the same time allowing free and varied access without risking data disclosure.

A first problem exists in that a user's data through their commercial life is not available from any single website to be stored or accessed. Much relevant data exists for each of us. To give but a small sample, isolated files exist for each of us with regards to banks, insurance, telecommunications suppliers, utilities and national/local taxation details. To collect such data together today would require multiple logins to each company/product and potentially insecure passing of personal data between multiple suppliers systems and the website. The present invention seeks to provide bi-directional company-to-customer secure communications to a central personal data store while minimising confidential information travelling by interceptable data such as packet.

It is to be noted that the UK government is implementing a service based on the use of individual personal data stores for just such a purpose, using a product from the community interest company "Mydex".

A second problem exists when a user may have several products from the same company, but, as the company or companies systems are arranged on a "product-silo" basis, it is often difficult to create a "single customer view" of all of the products a customer has. This often entails complex/error-prone matching of customer details across the systems. The present invention seeks to improve upon the situation by creating a "single customer view" by matching data in the personal Data store and multiple, disparate company systems, and associated challenge/response with the customer.

A third problem occurs in that a user often complains that talking to the right person in the company is very error-prone and that the user constantly have to provide the same security or personal data at each step along the chain until the right person is found. The present invention seeks to provide improvement there over by ensuring routing of support calls based on an individuals attributes (for example, high-end worth, or having a relationship manager) and with authentication from the personal Data store.

A fourth problem occurs when a user comes to purchase financial or other service-based products online, in that they often have to provide significant amounts of personal and identity/historic or payment details. Such information must be repeated for each supplier, although the data required from various only very slightly across each supplier. The present invention seeks to significantly reduce provision of personal data.

A fifth problem can occur when users may wish to aggregate all of their existing policies or products with one or more suppliers into a website. However, this often entails supplying existing logon or identity information for each product which is manually entered by the user. This is both insecure and time-consuming and requires the user to have set up for access to each product previously. The present invention seeks to obviate multiple logons and to reduce the associated data-transfer risk.

A sixth problem can occur when a user is in a physical retail outlet and once to purchase a product, they are then required to provide significant personal information verbally which is then entered by the agent. This is both time-consuming and error-prone, and is duplicated across lots of suppliers a customer may make purchases from. The present invention seeks to alleviate the data supply burden.

A seventh problem occurs when often users are members of a number of loyalty programs for credit cards (e.g. nectar), petrol, stores, airlines and a never ending list. However, it is often a requirement to carry physical evidence of membership of a loyalty program, as well as having to submit proof of purchase. Subsequent redemption of loyalty points is often seen difficultly after visiting a member store and hence the ability to redeem points at point of sale is wasted. The present invention seeks to allow loyalty transactions to be made employing a personal data store, allowing real-time loyalty offers via the point of sale. Also this would allow gathering evidence of purchase.

SUMMARY

According to a first aspect, the present invention consists in a system, including a network allowing bidirectional communication there through, the system comprising:

a secure data storage server including a personal data store for storing user personal data and user private data relating to the user, the secure status storage server being able bidirectionally to communicate with at least one client device and at least one service provider client;

where the at least one service provider client communicates with the secure data storage server with data encrypted using a first encryption key;

where the at least one client device communicates with the secure data storage server with data encrypted using a second encryption key;

where the at least one service provider client stores private data in the personal data store encrypted using a third encryption key;

and where the at least one client device stores personal data in the personal data store encrypted using a fourth encryption key.

According to a second aspect, the present invention consists in a method, including employing a network allowing bidirectional communication there through, the method comprising the steps:

a step of providing a secure data storage server including a personal data store for storing user public personal data and user private data relating to the user, the secure status storage server being enabled bidirectionally to communicate with at least one client device and at least one service provider client;

a step of the at least one service provider client communicating with the secure data storage server with data encrypted using a first encryption key;

a step of the at least one client device communicating with the secure data storage server with data encrypted using a second encryption key;

a step of the at least one service provider client storing private data in the personal data store encrypted using a third encryption key;

and a step of the at least one client device stores personal data in the personal data store encrypted using a fourth encryption key.

The invention further provides that the first encryption key can be a dedicated company communications encryption key.

The invention further provides that the second encryption key can be a dedicated customer encryption key.

The invention further provides that the third encryption key can be the first encryption key.

The invention further provides that the fourth encryption key can be the second encryption key.

The invention yet further provides that the second encryption key can be a company private encryption key.

The invention yet further provides that the fourth encryption key can be a customer private data encryption key.

The invention further provides that the at least one service provider client can access the personal data store(s) only from previously registered IP addresses.

The invention further provides that the at least one service provider client alone can have rights to access and change data that at least one service provider client provides.

The invention further provides that the secure data storage server can comprise a Crypt app server for cooperating with a client device, the crypt app server communicating, when used, with the secured data storage server to provide services.

The invention further provides that the secure data storage server can be operable to compare company data with private data to assemble a single customer view wherein all company private data is assembled and can be displayed for an individual customer, and that the compared private data can be from a single service provider client. Multiple views for multiple companies data for the same customer can be created The invention further provides that a customer can contact the Crypt app server to link a service provider client supportable product to that customer, that the service provider client can then use the customer's individual public data to verify the customer's identity and then to store contact information in the private data store to enable the customer to contact the service provider client company with contact history.

The invention provides that the customer can place a call to the Crypt app server and the Crypt app server can cause the contact information to be retrieved and the call automatically to be correctly relayed to the service provider client company at the same time causing the contact history to be made visible to the respondent at the service provider client company.

The invention can further comprise a context data store that can be operable to store results from the crypt app server.

The invention further provides that when the customer uses the client device to contact the Crypt app server to seek purchase of a service from a service provider client company, the service provider client company can access the customers public data to fill a validation template before accepting or rejecting the customer for sale or offer of a product.

The invention further provides that the service provider client company, if the particular requirements for customer validation are not met, can request further data from the customer, satisfactory provision whereof allows progress towards sale or offer of the product.

The invention further provides that a point of sale terminal can be coupled to the secure data storage server; that a client device can transfer data to the point of sale terminal identifying a customer; and that the point of sale terminal can transfer the customer identifying data to the secure data storage server for the customer's identity to be verified.

The invention further provides that the client device can transfer data to the point of sale terminal by at least one of: near field transmission; and optical imaging of an image displayed on a display on the client device.

The invention further provides that the optical image can be a one-dimensional or two dimensional barcode giving customer identification information.

The invention further provides that a customer can access the Crypt app server to link products and sales to loyalty schemes.

BRIEF DESCRIPTION OF THE DRAWINGS

The invention is described, by way of examples, to be read in conjunction with the appended drawings, in which.

DETAILED DESCRIPTION

The invention is now described in detail by way of examples.

Figure 1:
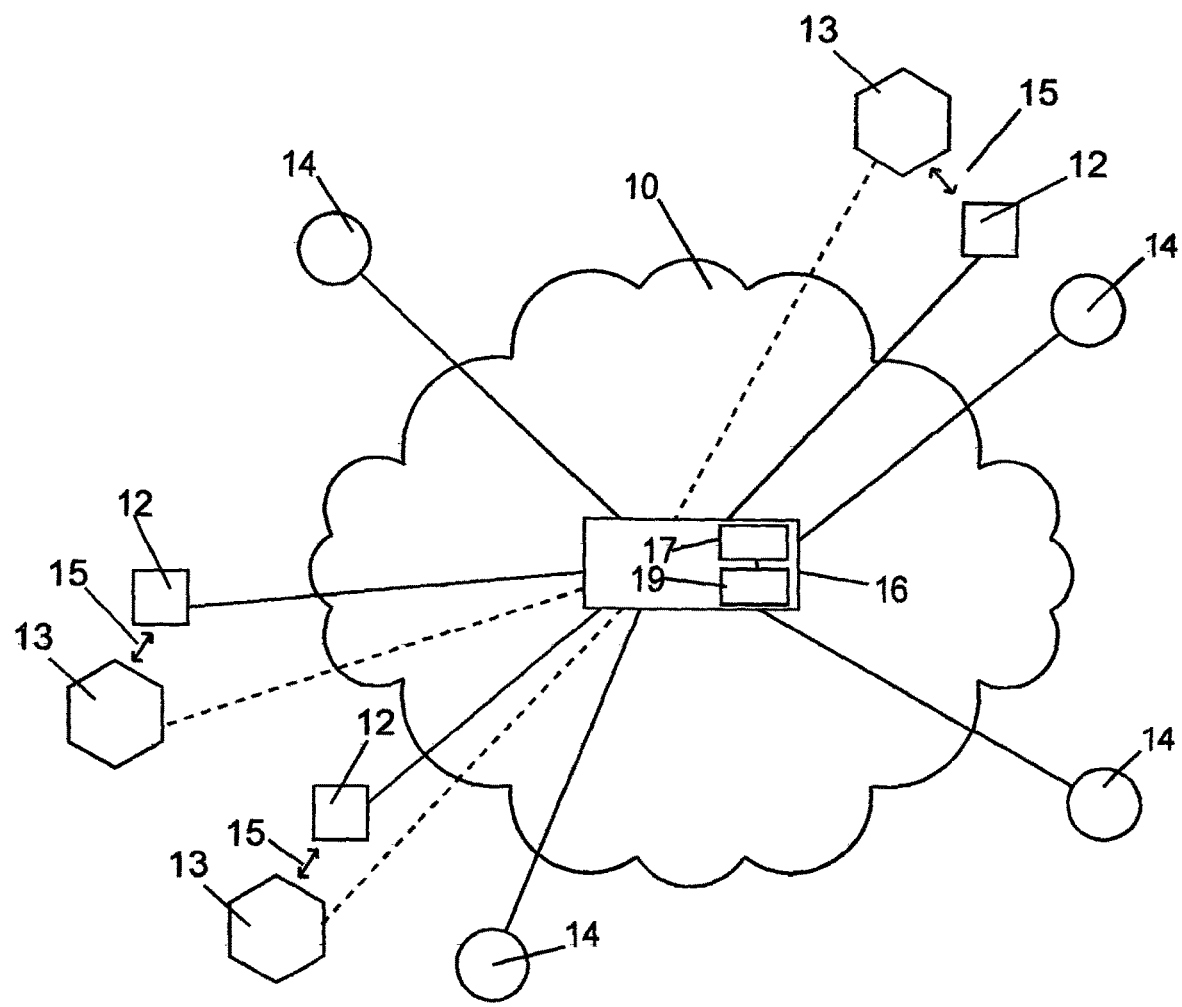
FIG. 1 is a schematic diagram illustrating one possible environment where in the present invention can be practised.

Attention is drawn to FIG. 1, a schematic diagram showing an environment in which the present invention can be practised.

A first example is here provided where in a company provides the input to the service provider client 14 to indicate to a customer, being the user, but not necessarily at that time, of a client device 12.

A network 10, such as the Internet, but not necessarily restricted thereto, is bidirectionally accessible by any one of a plurality of client devices 12. Each of the client devices 12 can be, but is not limited to, a network enabled smart phone, tablet, or other computing device such as a laptop, palmtop, or desktop personal computer. As new types of computing devices are developed, these too can be employed as client devices 12.

Service provider clients 14 are also bidirectionally coupled to the network 12. The service provider clients 14, in this instance, provide services of interest to the users of the client devices 12 and can comprise, but are not limited to, insurance services, record keeping services, banking services, retail services and any other type of service that maintains records that may be of interest to the users of the client devices 12.

The client devices 12 are operable to connect with a secure data storage server 16. The service provider clients are also operable to connect with the secure data storage server 16.

As will be described hereafter, the secure data storage server 16 interacts with the client devices 12 and the service provider clients 14 to provide a data storage service that is both secure in what is stored and secure in its sending and receiving.

While FIG. 1 shows a plurality of client devices 12 and service provider clients 14, the invention is hereafter explained as, for each task, employing just a single client device 12 interacting with the secure data storage server 16 together with a client device 12 user selected service provider clients 14.

In examples explained hereafter, each client device 12 may be operated in the presence of a point of sale terminal 13 with which it can be in near field communication 15. In the examples given hereafter, the client device is, for preference, a portable devices such as a smart phone or tablet. The portable device 12 can provide information concerning the identity of the user to the point of sale terminal 13 either by near field communication 15 or by display of a two dimensional barcode to the point of sale terminal 13.

The secure data storage server 16 comprises an Crypt app server 17 that interacts with the client device 12 when required, and with the point of sale terminal 13 when required, to receive and send data and requests and commands from and to the point of sale terminal 13 (when it is involved and the client device 12). The Crypt app server 17 uses the contents and services of one or more personal data store(s) (PDS), described hereafter, to provide secure data storage and useful services derived therefrom. A context data is stored 19 is associated with the crypt app server 17 and stores data derived and found from the use of the app.

The crypt app server 17 also provides service for a plurality of apps (computer programmes accessed by a client device 12 using a graphical interface). The crypt app server 17 provides data decryption services to read the stored encrypted information from the service provider clients 14 and the stored encrypted information provided by the client device 12.

While the secure data storage server 16 is shown in FIG. 1 and an integral whole, it is to be appreciated that the present invention also provides that the secure data storage server 16 can be implemented as a so-call "cloud" arrangement where a plurality of singly addressable inter-operative network sites co-operate with one another to provide the functions described.

Figure 2:
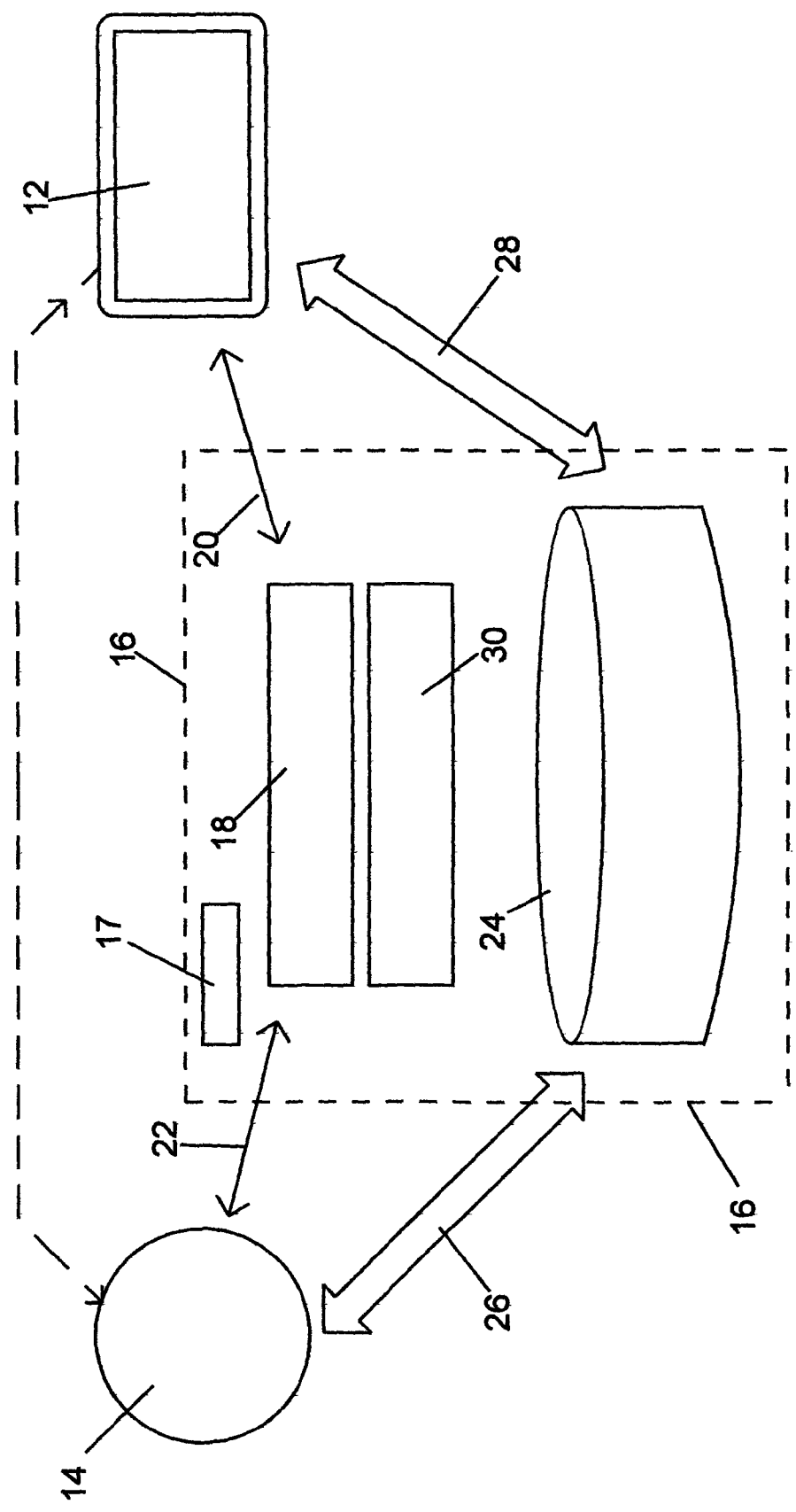
FIG. 2 is a schematic diagram illustrating in greater detail the arrangement of FIG. 1 when executing a task.

Attention is next drawn to FIG. 2, a schematic diagram illustrating in greater detail the arrangement of FIG. 1 when executing a task. Where communications are shown, it is to be understood that those communications are provided through the network 10. FIG. 2 contains many elements in common with those shown in FIG. 1, and it is to be understood that like reference numerals denote like items.

The secure data storage server 16 comprises, as well as the Crypt app server 17, a change server 18. The change server 18 communicates with the selected service provider client 14 by means of a service provider to change server connection 22 and the client device 12 communicates with the change server 18 by a client device to change server connection 20.

The secure data store server 16 also comprises one or more secure personal data store(s) (PDS) 24 where in data is stored in a hyper-secure manner. The service provider client 14 is coupled to the personal data store 24 by a service provider to personal data store connection 26 allowing encrypted data to be stored and recovered. The client device 12 is coupled to the personal data store 24 by means of a client device to personal data store connection 28, allowing encrypted data to be stored and recovered.

The secure data storage server 16 also comprises a crypt manager 30 operable to manage the information stored in the personal data store 24.

The service provider to personal data store connection 26 for preference employs a public key to access the personal data store 24, with the restriction that communication can only be effected via known IP addresses.

The client device to personal data store connection 28 for preference employs a private key to access the personal data store 24.

According to a first option for stored company data encryption, company data is stored within the personal data store 24 using the same public key access as is used in the service provider the personal data store connection 26, thereby providing a technical advantage of avoiding decryption and re-encryption for storage.

According to a second option for stored company data encryption, company data is stored within the personal data store 24 using a company private encryption key.

According to a first option for stored personal data encryption, personal data is encrypted using the same customer communication key as is used in the client device to personal data store connection 28. This measure provides a technical improvement by avoiding the necessity of decryption and re-encryption of the personal data.

According to a second option for stored personal data encryption, personal data is encrypted using a customer private encryption key.

The change server 18 provides two separate channels, a first channel being for informing the client device 12 of changes made by the service provider client 14 and a second channel being for the client device 12 informing the service provider clients 14 of changes made by the client device 12.

A supplier of data for storage in the personal data store 24 only has rights to access or change specific data.

Although only one personal data store 24 is shown in FIG. 2, it is to be appreciated that the invention allows for the provision of multiple individual person data stores and data store elements, sufficient to accommodate the very large amounts of data to be stored and retrieved. Similarly a personal data store may be a subset or partition of another data store, with the appropriate access controls as described previously producing the same effect Encryption of stored data within the personal data store 24 with an unknown key (for example the customer's well known word) means that no one else, not even the owners of the personal data store 25 and its peripheral parts, can read data stored therein. The data remains secure for all time. If a user forgets his ability to access, and has to start again, the customer is assured that his "lost" data cannot be accessed by others.

The personal data store 24 is described hereafter as being employed by a user to create associations or link between suppliers and products and to establish product status. It is to be understood that the personal data store 24 is also employed to store identity of supplied products and status, as well as identification for the individual user.

Figure 3:
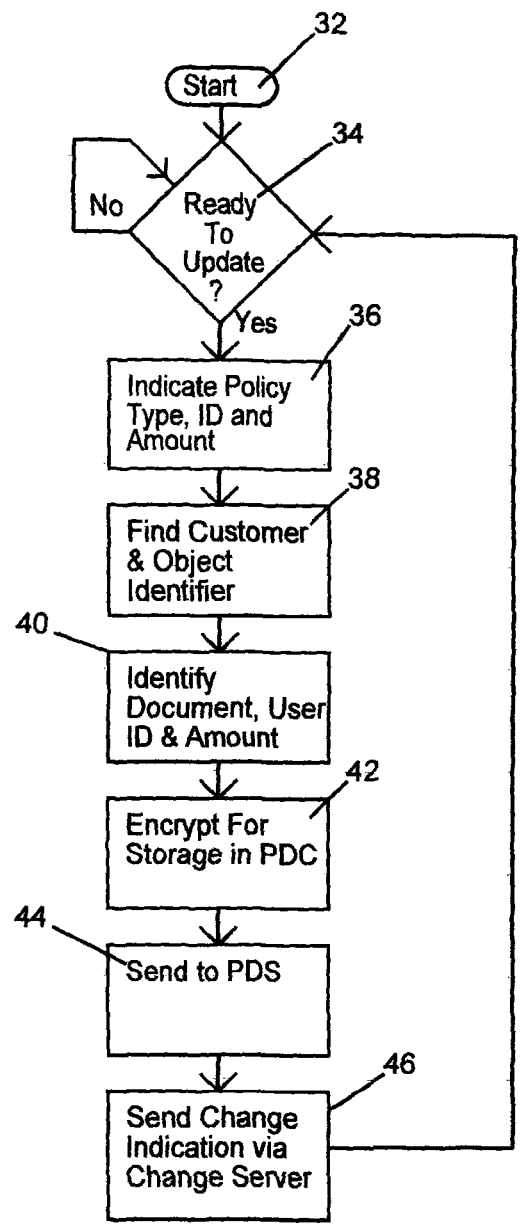
FIG. 3 provides an exemplary possible flow chart that can be executed using the apparatus of FIG. 2.

Attention is drawn to FIG. 3 illustrating exemplary data flow that can be undertaken using the apparatus of FIG. 2. In this example, a pension company updates an individual customer's record with a new pension amount. It is to be understood that the invention is not limited to this example, and the company can be for any purpose and amend any record of any kind.

From a start 32 a first test 34 checks to see if the insurance company is ready to update a customer entry. If there is no updating to be done, operation stays in the first test 34. If the insurance company is ready to provide a customer update, a first operation 36 communicates to the service provider 14 client software an indication of the type of policy, the policy identifier and the new amount in the pension fund. The service provider 14 also comprises an adapter. A second operation 38 working through the encryption adapter software finds the customer and object identifier and a third operation 40 also provides data to be sent to the personal data store 24 such as indication of the nature of the data to be upgraded, the document identifier, the identity of the final user and the fund amount. It is to be understood that in other circumstances different types of data would be selected for storage in the personal data store 24. A fourth operation 42 then has the information encrypted to be sent from the service provider client 14 to the personal data store 24 using the public key and IP address identification as described above. A fifth operation 44 then sends the information to the personal data store (PDS) 24.

The service provider client 14, in a sixth operation 46, then contacts the change server 18, shown in FIG. 2, to indicate to the customer that a change has been made to the content of the personal data store 24 for data from the service provider 14 for the particular customer (as can be contacted through the client device 12). The message might be, for example, "fund amounts changed made to document ID 170". Whatever the message actually is, the message reflects the nature of the change in a non-informative way to avoid giving out information to any eavesdroppers.

Thereafter, the customer can activate the client device 12 to access the personal data store 24 to learn new information. The message provided to the customer by the sixth operation 46 is, for preference, encrypted both from the service provider client 14 and when delivered to the client device 12.

The personal data store 24 has the crypt manager 30 manage the personal and public data of the customer, and private and public data of the company.

In a second example, the situation is shown where a customer may have several products from the same company. Unfortunately, in this instance the company or company systems are arranged on a "product-silo" basis, and it is often difficult to create a quote single customer view" of all of the products a customer has. In the past, the customer was required to employ complex and error-prone matching of customer data across many company systems.

The present invention allows creation of a "single customer view" by matching data in the personal data store and company systems and associated challenge response with the customer.

Figure 4:
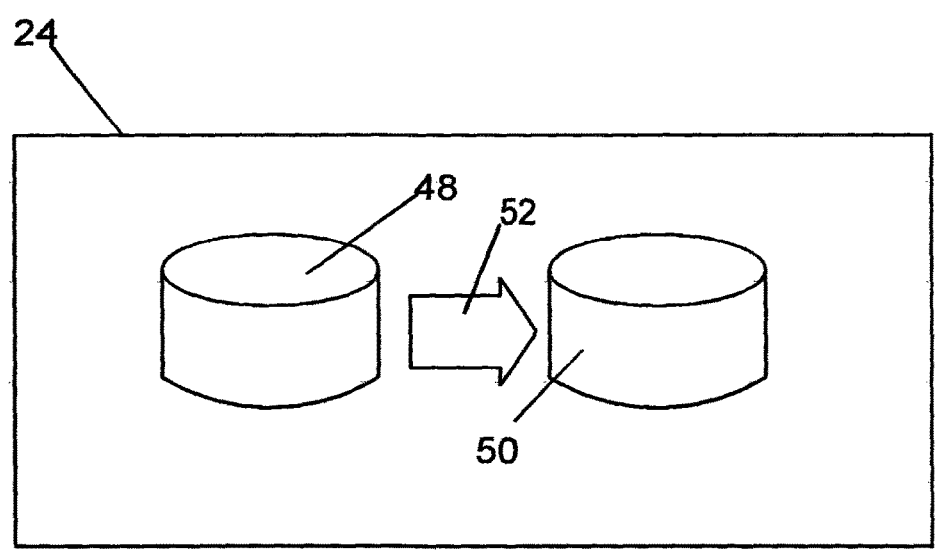
FIG. 4 is a schematic diagram showing how the personal data store of FIGS. 1 and 2 stores two types of data.

Attention is next drawn to FIG. 4, a schematic diagram showing how the personal data store 24 stores two types of data.

The personal data store 24 provides a store for each of two types of data.

A first type of data is private data and is stored in a person's private company data memory 48. The private data memory 48 stores such things as company data that is not available for public knowledge.

A second type of data is persons public data stored in a user public data memory 50. The public data memory 50 stores such things as names and addresses and other publicly available information that helps to identify a particular customer. Further data can be, but is not limited to, first name, surname, and date birth.

Each item of private data held in the user private data memory 48 may have a corresponding item of persons public data held in the public data memory 50, as indicated by association arrow 52.

While there is only one personal data store 24 shown in FIG. 4, It is to be appreciated that the invention provides for more that one personal data store 24 to be provided. The invention also provides that each personal data store 24 can accommodate only one, or more than one of each type private 48 and public 50 data memories. The invention merely requires that the different data can be stored and retrieved as described.

The arrangement of the personal data store 24, is such that a company may define data to be private to the company, or made public and available to a specific customer.

Similarly the arrangement of the personal data store 24, is such that a customer may define data to be private to the customer, or made public and available to a specific company.

The status of customer data being made public or private can be changed at the discretion of the customer, either for a limited time/specific interaction, or ongoing Similarly the status of company data being made public or private can be changed at the discretion of the company, either for a limited time/specific interaction, or ongoing.

Figure 5:
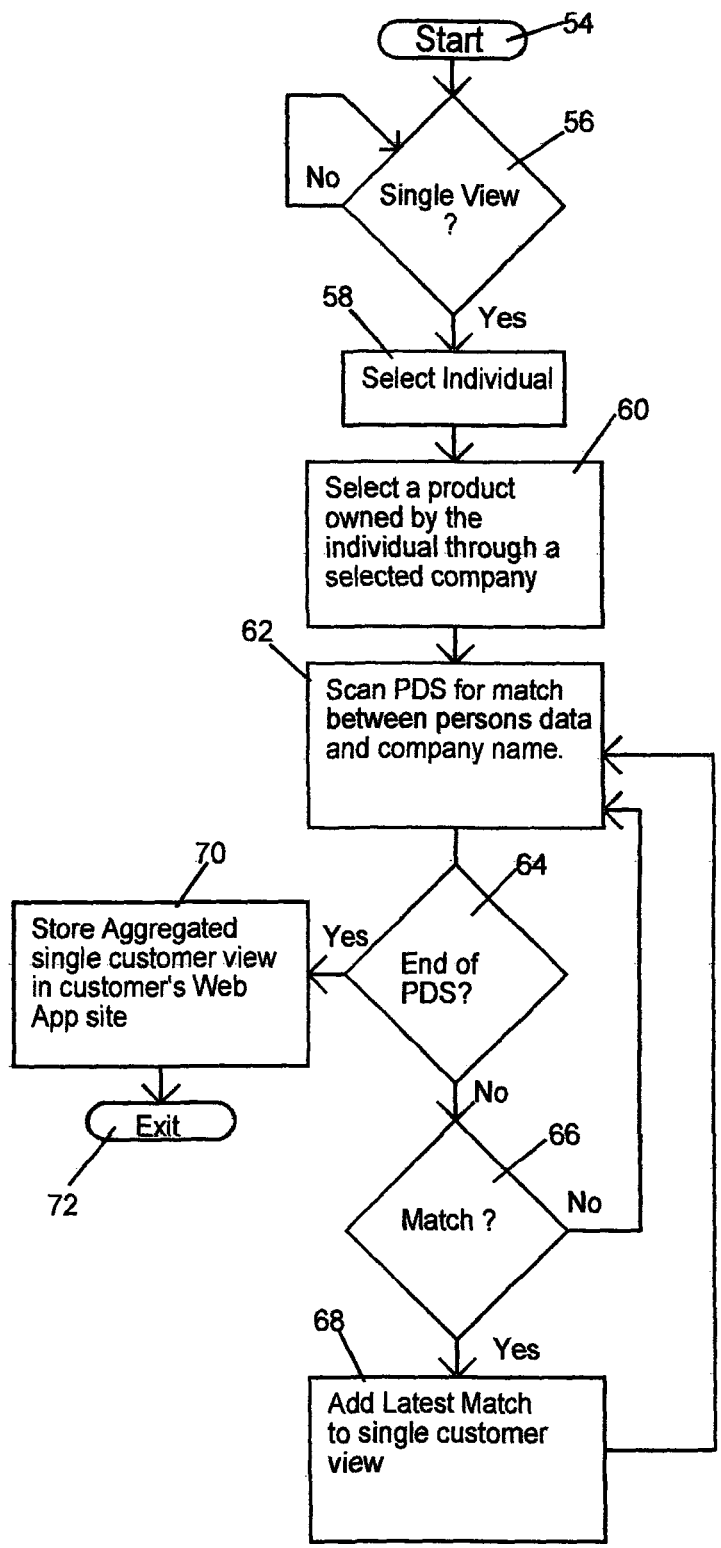
FIG. 5, is an exemplary flow chart illustrating one way in which the secure data storage server can create a "single customer view" from diverse data.

Attention is next drawn to FIG. 5, a flow chart illustrating one way in which the secure data storage server can create a "single customer view" from diverse data, referred to above as the second problem.

Figure 7:
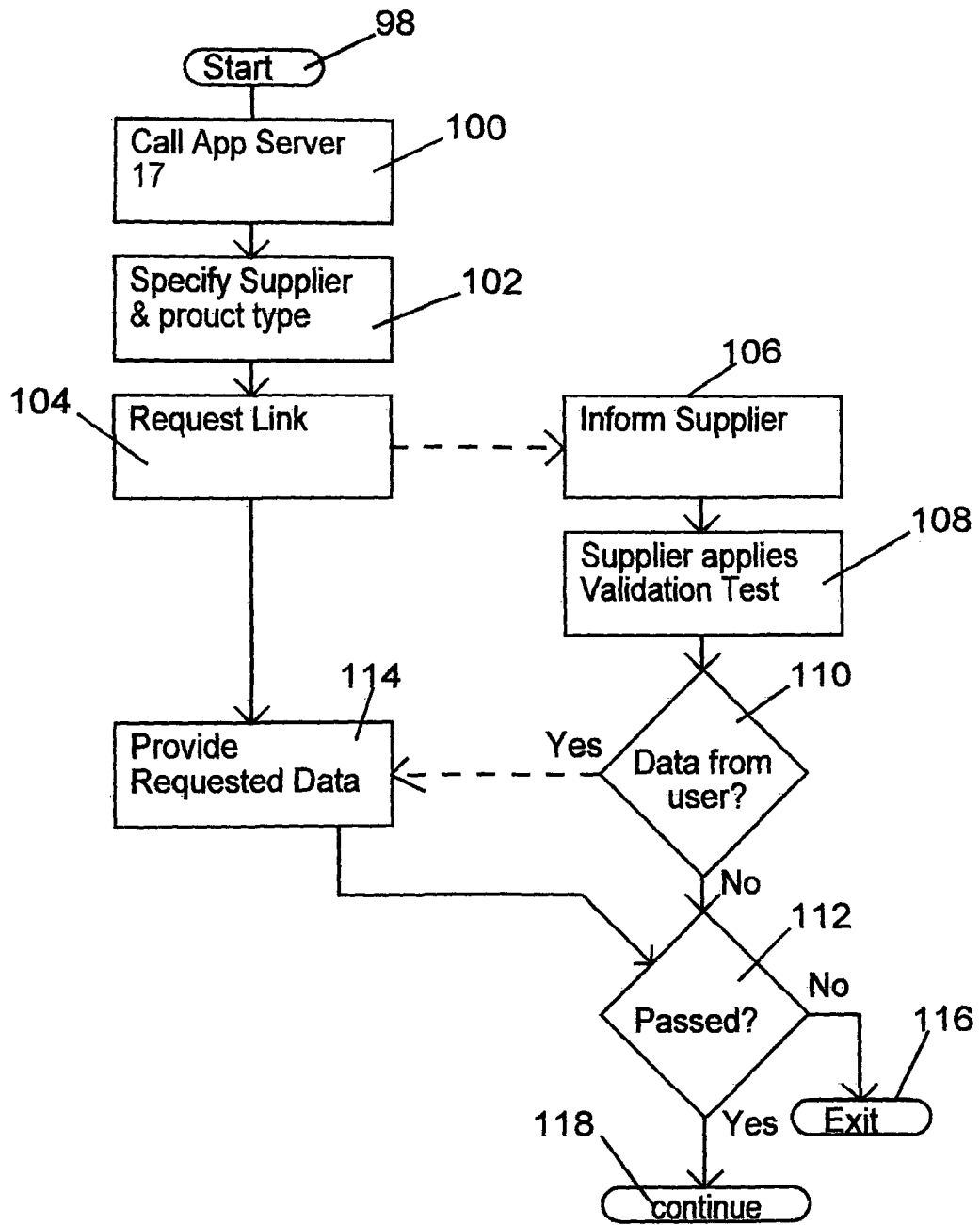
FIG. 7 is an exemplary flow chart illustrating one possible way in which the present invention assists to resolve the fifth problem.

The solution to this the second problem is dependent upon the prior solution of the fifth problem as described hereafter with reference to FIG. 7.

From a start 54 a second test 56 looks to see if a single customer view is desired. If the second test 56 finds that a single customer view is desired, a seventh operation 58 selects the individual customer for whom a single customer view is to be created. The selection is achieved by selecting from the user public data memory 48.

An eighth operation 60 then selects a product owned by the individual through the company which it has been decided to create a single customer view. This can be selected by the customer, or the single customer view selection started during a customer inspection session where both customers public and private details are available for a single product.

What ever way the company and individual are selected, at the end of the eighth operation 60 all the information necessary to create a single customer view is available. A ninth operation 62 then scans the contents of the personal data store 24, looking for matches between the selected individual customer, details of which are found in the persons public data memory 48, and the selected company and products found in the persons five data memory 50.

A third test 64 checks to see if all of the records possible to the end of the personal data store 24 have been checked.

If the third test 64 finds that there are still records remaining to be searched in the personal data store 24, a fourth test 66 checks to see if a match between the selected individual and the selected company has been found. If the fourth test 66 finds that no match has been found, control is passed back to the ninth operation 62 to continue checking for matches.

If the fourth test 66 finds that a match has been found between the selected individual and a selected company, a tenth operation 68 adds customer and company product details to an agglomerated single customer view. Control is then passed back to the ninth operation 62 to continue checking the personal data stores 24 for matches.

If the third test 64 finds that the personal data store 24 has been totally checked and no further matches will be found, and eleventh operation 70 stores the aggregated single customer view, as collected in the tenth operation 68, in, for preference, a customer personal program area such as an App allowing a customer to call up their single customer view at any time.

For preference, the single customer view is used or maintained on each occasion that the customer updates are personal information (e.g. telephone number) and the personal program area (App) informs the company product systems of the changes.

A third problem arises when a customer requires to communicate with the right person in the company. Finding the right person to talk to can be very error prone and a customer is required constantly to provide the same security of personal data at each step along the chain until the right person is reached.

The present invention allows an individual to avoid such difficulties.

To obtain access to the right support from a company, typically at least three sets of data are required. A first set of data identifies the product that the customer needs support with. A second set of data is the details within that company specific to the product. A third set of data comprises authentication information to allow a support person to know they are dealing with the product owner. In addition, other information may be required such as whether or not the customer has been allocated a specific relation manager and details of any can previous communications that have been made around the product and around the support need.

The secure data storage server 16, as earlier described, comprises a user public data memory 46 and a user private data memory 50. The company links a product with a customer, thereby creating an object which is stored in the user private data memory 50 data to represent that product, the record containing all key information around that product.

If available, the company also adds extra information regarding support which is not typically displayed to the customer. Such information can include: which phone number or video call address is correct specific to the product, and the customer is in a specific segment, for example, "high net worth" or "must retain". Please contact details may be personalised to phone numbers and/or addresses that have reduce queues or higher trained staff, to give but two examples. The extra information can also give details of whether the customer has a specific relationship manager, broker etc, and provide details of this, and associated contact information.

The customer, using the smart phone client device 12, places a call through the crypt app server 17, with the customer providing information as for which product they require support.

The crypt app server 17 then employs the personal data store 24 to contain information relative to the company and product and to route the contact, which can be a voice call, a video call, a conference call or similar communication, to the correct part of the company, appropriate relationship manager, and so on. In addition, the public key for the customer can be passed the company which allows the company to retrieve identity and/or indication information from the personal data store 24 through integration with interactive voice systems, meaning that information does not require to be provided by the customer.

Furthermore, when an agent of the company is connected with the call, the customer public key and personal data store 24 access allows information around the product the customer requires support for in any previous correspondence to be provided to the agent of the company automatically.

Figure 6A:
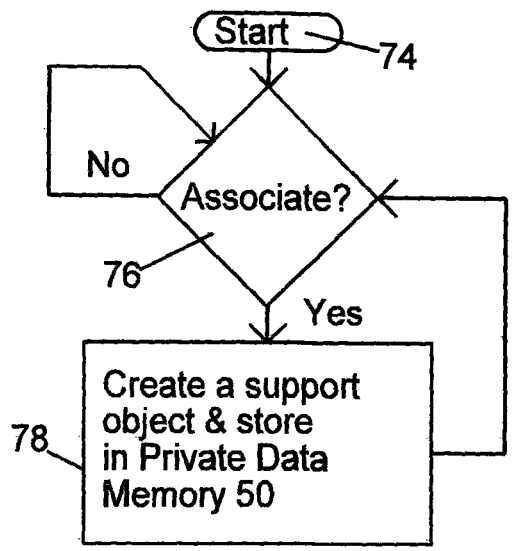
FIG. 6A is an exemplary flowchart illustrating one way in which the invention can be employed to create links between a product and a user.

Attention is drawn to FIG. 6A, an exemplary flowchart illustrating one of many ways in which the invention can be employed to overcome the third problem. FIG. 6A shows how a Link is created between a product and a user.

From a start 74 a fifth test 76 looks to see if an association or "link" is to be created between an individual user and a product. Such an association can be set up when the user first purchases a product, or can be set up later when a product requires assistance. In any event, the action shown in FIG. 6A takes place when the service provider 14 is online and has access to the personal data of a user.

If no association is to be made, control is passed to the fifth test 76. If an association or link is to be made, control is passed to a twelfth operation 78 that creates a product support object stored within the private data memory 50. As earlier stated, the support object includes information identifying the product that the customer needs support with, any data from the supplying company specific to the product, and authentication information to allow a support person to be aware whether or not they are dealing with the product owner. Other information can also be supplied, as stated, whether or not the customer has been allocated a specific relation manager, and details of any previous communication made around the product and around support need.

Other information includes direction of any calls from the product customer to the product supplying company.

Figure 6B:
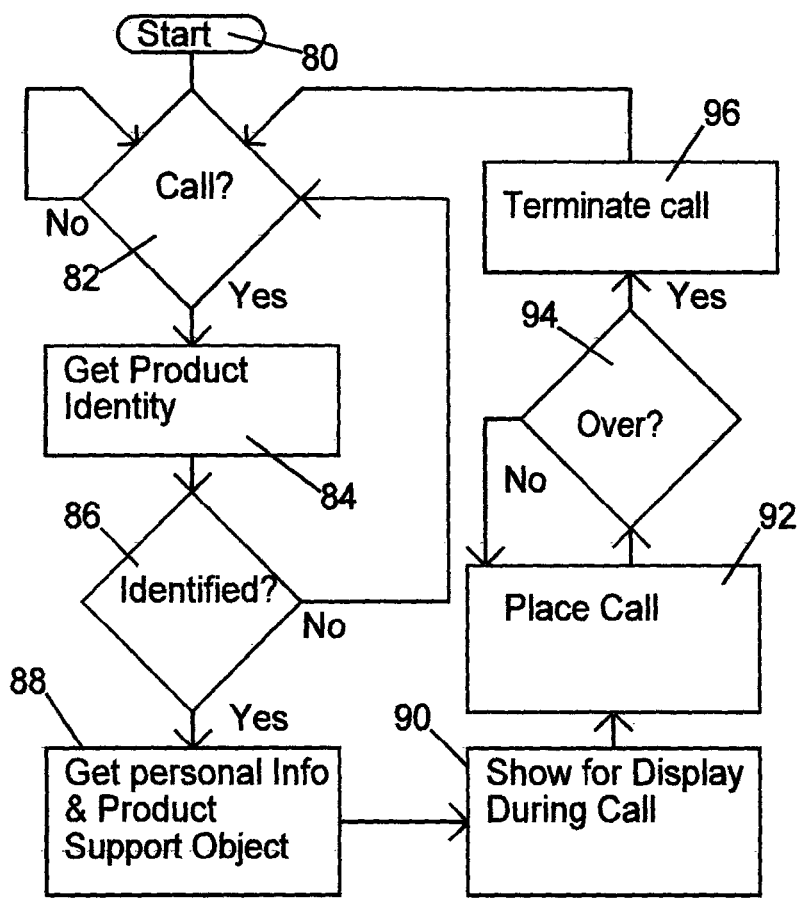
FIG. 6B, an exemplary flow chart illustrating one way in which the app server coupled with a context data store can interact with a user making a call seeking product assistance from a company.

Attention is next drawn to FIG. 6B, an exemplary flow chart illustrating one way in which the crypt app server 17 can interact with a user making a call seeking product assistance from a company.

From a start 80 a sixth test 82 looks to see whether the crypt app server 17 call has received from a mobile telephone client device 12 seeking product assistance from a company. If the sixth test 82 finds that such a call has been received, a thirteenth operation 84 seeks to obtain the product identity from the user is seeking product assistance. If a seventh test 86 finds that no information that can be identified has been obtained, control is passed back to the sixth test 82 thereby effectively terminating the process. If the seventh test 86 finds that the product has been adequately identified, a fourteenth operation 88 gets the personal information and the product support object from the personal data stored 24 and a fifteenth operation 90 gets the retrieved data of the fourteenth operation 88 ready to show to the company call recipient when a call is made. A sixteenth operation 92 then places the call to the company and to the designated individual from the product support object until an eighth test 92 detects that the caller has hung up. Control then passes to a seventeenth operation 96 that has the crypt app server terminate the call and passes control back to the six test 82 ready to receive any other incoming call seeking product assistance for my company.

At the end of this process the company can add new information to the product support object giving details obtains during the course of the call that has been made.

A fourth problem arises when a customer comes to purchase financial or other service-based products online. In such circumstances, the customer often has to provide a significant amount of personal details, identity details, historic and perhaps payment details. Such information must be repeated for each new supplier although the data required often varies only slightly, if at all, across the supplier. The present invention provides minimisation of data required to process product applications the use of the personal data store 24, including (if required) authentication of the user.

The customer, using the client device 12 via the crypt app server 17, requests setting up a product (i.e. he/she would like to take up an offer to purchase the product or service). In registering the product, the customer initially provides only indication of the type of product (e.g. car insurance) and indication for the product (for example, policy identification).

At this point, the secure data storage server 16 informs the selected the supplier that they would like to link that supplier product to their website and/or application. To prevent the possibility of fraud, the supplier requires additional information to ensure that the customer is who they say they are. Such information can include postcode, dates of birth, bank used for direct debits, and so on. This is a validation template, that is, template of the type of information that must be valid in order to pass security for the supplier, and typically, some items of information may be more important than others. For example, the date of birth may be more important the mobile phone numbers which can perform out of date.

The secure data storage server 16 uses the personal data stored in the user public data memory 48 and elsewhere in the personal data store to match the validation template. Only when the validation data is not available in the personal data store 24 and/or does not match that held by the supplier, is the customer prompted to supply the correct data near the Or website. The vast majority of data will not need to be entered by the customer, and only when there is absence of data or a mismatch.

If all the validation is passed, then the account becomes linked to the customer in the personal data store 24, and appropriate product information is pushed to the customer via the personal data store 24 and the secure status storage service 16 and/or its app 17. Such information can include, in the case of insurance, policy details, policy documents, further office and so on.

A fifth problem can be resolved where use of the personal data store 24 assists in customer transactions when a particular customer desires to aggregate all of their existing products or policies with one or more suppliers into a single application or website. To do this in the manner previously available, entails supplying existing logon and/or identity information for each product, being manually entered by the customer. Such a process is not only very insecure but is also time consuming and requires the customer to have set up full access for each product on previous occasions.

The customer using the client device 12 has an account with the personal data store 24. This account, as earlier stated, is hyper-secure with all data highly encrypted in the personal data store 24 and encrypted during transmission (e.g. using HTTPS). The personal data store access also has a scheme for identifying a user, for example but not limited to, provision of a user name and/or password. There is also a "private key" scheme for decrypting data whereby, as an example, the customer provides memorable words. The memorable words is then used as the encryption/decryption key for data from the customer.

Further security schemes may also be provided including registration of physical devices such as tablets and phones running an application interface (App). Once a user has authenticated themselves, they can push or pull information into and out of the personal data store 24 via an appropriate interface program (app) or website accessing the application program interface (API) for the personal data store 24, using the customer private key.

As was earlier stated, the personal data stores 24 personal information, such as date of birth, name, addresses, asset such as cars etc, in a persons public data memory 48 (shown in FIG. 4) and stores private information (such as bank accounts, insurance policies, mobile accounts and so on) in a user private data memory 50, also shown in FIG. 4. Other information can also be held such as communications from suppliers, policy documents, applications for product etc.

For each product or policy that a customer has, then any form of physical documents such as policy documents, statements and so on, can be printed with a two dimensional barcode (QR code), barcodes or similar identifying image. Where a customer does not have any physical documents, then the supplier can email them their identifying image, or can otherwise text or distribute to the customer. The identifying code, such as a QR code, identifies the company, type of product and the product identifier, such as a policy number. For additional security, these identities may not be those publicly used, but maybe, instead be in internal identifying used by the company.

The customer then uses the crypt app server 17 to send the identifying code. The sending of identifying code causes the product automatically to be linked. This is in contrast with the situation where the customer is communicating without the use of a QR code or similar, in which case the customer would have to manually enter the identifying product information.

Using the customer's public key, the company is able to securely access the customer's personal data store 24 and to review both the internal identifying information scanned from the image code (QR), and information useful to authenticate that a policy of product does indeed belong to the customer, such information including address, date of birth, and any other relevant personal identifiable data.

The company then runs an appropriate risk-based data matching routine that determines if the customer information retrieved from the personal data store 24 matches that retrieved from the product or policy identified if the information does not match, but the mismatch is very close, the company asks the customer one or more questions, using the crypt app server 17 for correct data to match the selected policy or product.

In those circumstances where the match is not perfect, or the additional security questions do not create a match, the company asks the customer one or more security questions using the crypt app server 17 that are not typically stored in the customer's personal data store 24.

Assuming there is sufficient match to positively identify the customer is the owner of the product or policy, then an appropriate "product/policy object" is created in the personal data stored 24, together with associated documentation. This then enables the customer to interact and manage with the product policy object using the crypt app server 17 without further authentication being required.

Attention is drawn to FIG. 7 showing an exemplary flow chart illustrating one possible way in which the present invention assists to resolve the fifth problem.

The left-hand column of FIG. 7 shows the activities that take place within the crypt app server 17 in its transactions with a user 12. The right-hand column of FIG. 7 shows operations undertaken within the secure data storage server 16.

From a start and 98, in an eighteenth operation 100 the customer 12 contacts the crypt app server 17 and indicates in a nineteenth operation 102 what supplier is required and the type of product that is required from the supplier. A twentieth operation 104 then requests to the crypt app server 17 that a link be formed and passes the request to a twenty first operation 106 in the secure data storage server 16.

In a twenty second operation 108 the supplier accesses the personal data, as described above, of the customer and applies the validation test to see if the customer is genuine. A ninth test 110 checks to see if data is needed from the customer, the customer Supply data also being as described above. If no data is required from the Customer, a tenth test 112 looks to see if the customers request has passed the validation test. If the customer's approach has not passed the validation test, the process ends via exit 116. If the customer's approach has passed the validation test, the interaction between the supplier and the customer carries on through continuation 118.

If the ninth test 110 finds that more details are needed from the customer to be applied to the validation test, the ninth test passes the request to a twenty third operation 114 of the crypt app server 17 which gathers stay requested information, as described above, and includes it in the criteria for the tenth test 112 to determine whether or not the validity test has been passed.

A sixth problem in which the present invention, by use of the personal data store 24, can assist occurs when a customer, at a retail outlet, desires to purchase a product. This often leads the customer to provide significant amounts of personal information, such provision being made by word-of-mouth and data entry being made by a person in attendance, typically at a point of sale terminal 13. Such a time-consuming process that is often repeated, as will be seen, is unnecessary when the present invention is employed.

Returning attention briefly back to FIG. 1, in such a sales situation the client device 12 is close by the point of sale terminal 13. As a first option, the client device 12 can provide near field communication 15 with the point of sale terminal 13. As another option, the point of sale terminal 13 can capture an image displayed on the screen of the client device 13. The image represents the identity of the client device 12 and points to personal data and company data related thereto.

The point of sale terminal 13 is put into communication with the crypt app server 17, indicated in FIG. 1 by broken line. The point of sale terminal 13 relays the near field communication 15 from the client device 12, and/or transmits the captured image to the crypt app server 17.

As earlier stated, the personal data store 24 stores the customers personal identification data in the user public data memory 48 (shown in FIG. 4) and stores the customers company memory in the user private data memory 50.

The crypt app server 17 employs the facilities of the secure data storage server 16. The customer may desire to share their personal information (name address etc) and product information (bank account etc) with a retailer in order to simplify and speed up the purchase process, and to create a new policy or contract. Other information could also be useful for the retailer. Such information can include authentication tokens as proof of identity, credit history and credit rating, copies of existing contracts such as utility bills, and so on.

The crypt app server 17 uses the customer public key to push a message to the customer telling the customer what information the retailer wishes to obtain in order to set up a contract. The customer then has the option to except this data requests, or to reject it.

If the customer chooses to accept the request to access this information, this is provided to the retailer. If all of the information is available in the customers personal data store 24, then the retailer can create a contract or policy immediately, and can push the policy or contract into the crypt app server 17. The customer may then see the purchased product information.

If the customers personal data store 24 does not contain all information required by the retailer, then further questions/ obtain this data are displayed to the point of sale operator in the store prompting them to as the customer to provide the missing information. This is deemed to be more efficient than prompting the customer using messages from the crypt app server 17, but may be done via the client device for some identifying information (e.g. provide fingerprint, or password) that should not be shared with the point of sale operator.

Once a missing data is provided by the customer, this information is also stored in the customers personal data store 24, assuming the customer's happy so to do, so that the need for the customer to be asked the same question again disappears.

Yet another problem that can be solved by use of the personal data store 24 lies in, for example, loyalty programs.

Attention is once again redrawn to FIG. 1.

The personal data store 24 for a customer is hyper-secure with all of the data encrypted in the personal data store and encrypted during transmission to and from the personal data stored. The personal data store 24 also includes a scheme for identifying a customer, for example, a username combined with a password, and a private key scheme for decrypting data, such as employing a memorable word to act as an encryption key for that data. Further security schemes may also be put into place including registration of physical devices such as tablets, where phones and other apparatus. Once a customer has authenticated themselves they may pull or push information into the personal data store 24 with an appropriate app, website and application programming interface (API), using the customer private key.

The customer can use this facility to associate one or more loyalty accounts with the personal data store 24 via the crypt app server 17 employing the secure data storage server 16.

The crypt app server 17 can then employ the app as part of one or more loyalty programs. This can include: registering that an appropriate purchase was made that is eligible within a particular loyalty program; registering that an appropriate access to services was made that is eligible within a particular loyalty program; pushing loyalty program offers to the crypt app server using the associated app including when and perhaps where purchase was made; and using redemption points from a loyalty program for associated discounts at a point of sale 13.

To summarise the invention as described:
1. Each customer has a personal data store where data storage and access is secured by public/private key encryption, and encrypted communications using, for example, HTTPS encryption.
2. Each company has a personal data store for each customer, where data and access is secured by public/private key encryption, and communication by using encryption.
3. The service maintains a context data store of relationships between customers and companies and service/products provided where data store and access is secured by public/private key encryption and communications using encryption
4. Furthermore there are IP address restrictions and/or the use of Virtual Private|Network) (VPN) tunnels for accessing customer, company and context data stores (e.g. company can only access customers data store where request originates from a specific known IP range/VPN)
5. Further Security is provided by: the personal data store 24 being unique to an individual—access to one store does not provide access to any other store (and hence other customers data)
6. Further Security is also provided by the Personally identifiable customer data only being stored in the customer personal data store; and the requirement that the customer must give explicit read/write/create access to companies to access the customer personal data store; and companies must access through known IP address ranges.
7. Yet further security is provided by the product information for a customer being stored in a company personal data store specific to that customer, which the company may give explicit read access to some items of data to the customer. This personal data store does not have customer personally identifiable data—hence if compromised could not establish which customer the data is for
8. Still more security is provided by the context data store, that describes the relationship between customers, companies and products/services, for example that a particular customer has an identified product from a specified company, holds only internal representations of customer, company and product, hence if data compromised it could not be possible to establish customer, company or product In addition, the personal data stores can be virtual—e.g. a company personal data store may be a protected area within a customers personal data store. However personal data stores are always individual to specific customers, and access to one PDS 24 does not provide information for other customers The invention has so far been described with reference to specific examples. It is to be appreciated that those skilled in the art will be aware of many variants and modifications that can be applied in the examples given above without deviating from the invention as claimed.

The invention is further explained and clarified by the claims appended hereafter.

The invention claimed is:

1. A system for controlling bidirectional communication between computing devices connected to a network, the computing devices including one or more client devices controlled by at least one client and one or more service provider devices controlled by at least one service provider, the system comprising:
   at least one server communicatively connected to at least one data store comprising client data having public data and private data relating to each of the at least one client, wherein the server is bi-directionally communicating with at least one client device and at least one service provider device;
   wherein the server is configured to
   store and retrieve
      the client data from the at least one client, wherein the client data is encrypted and stored using a respective client device's private key encryption, and
      service provider data from the at least one service provider, wherein the service provider data is encrypted and stored using a respective service provider device's private key encryption;
   select the at least one client and at least one service provider; and
   send and receive, upon consent from the selected client, the client device's public key to the selected service provider using a first encrypted communication, and service provider device's public key to the selected client using a second encrypted communication.

2. The system according to claim 1, wherein the at least one service provider provides services of interest to the at least one clients and the services comprise at least insurance, record keeping, banking, and retail.

3. The system according to claim 1, wherein the computing devices further comprise a plurality of point of sale devices in one to one correspondence with the respective one or more client devices.

4. The system according to claim 3, wherein the one or more client devices communicate with the plurality of point of sale devices via at least one of near field communication, QR code, and bar code.

5. The system according to claim 4, wherein the communication of the one or more client devices and the respective plurality of point of sale devices includes receiving and sending client data, service provider data, requests and commands.

6. The system according to claim 3, wherein the at least one server communicates with the one or more client devices and with the plurality of point of sale devices.

7. The system according to claim 1, wherein the server is configured to select different of the at least one client and at least one service provider, respectively.

8. The system according to claim 1, wherein the one or more service provider devices accesses the at least one data store only from a previously registered IP address.

9. The system according to claim 1 wherein each of one or more of service provider devices alone has rights to access and change the client data provided by the one or more service provider devices.

10. The system according to claim 1, wherein the server is further configured to cooperate with the one or more client devices.

11. The system according to claim 10, further comprising a change server for establishing and changing a data store to client connection and data store to service provider connection and a client connection and service provider connection.

12. The system according to claim 10, wherein the server is operable to compare the public data with private data to assemble a single view for each of the at least one clients, wherein all the private data relating to each client is assembled and displayed.

13. The system according to claim 12, wherein the service provider data includes public service provider data and private service provider data and the private service provider data is received from each of the one or more plurality of service provider devices.

14. A method for controlling bidirectional communication between computing devices connected to a network, the computing devices including one or more client devices controlled by at least one client and one or more service provider devices controlled by at least one service provider, the method comprising the steps of:
providing at least one server communicatively connected to at least one data store comprising client data having public data and private data relating to each of the at least one client, wherein the server is bidirectionally communicating with at least one client device and at least one service provider device;
on the server:
storing and retrieving
the client data from the at least one client, wherein the client data is encrypted and stored using a respective client device's private key encryption, and
service provider data from the at least one service provider, wherein the service provider data is encrypted and stored using a respective service provider device's private key encryption;

selecting the at least one client and at least one service provider; and
sending and receiving, upon consent from the selected client,
the client device's public key to the selected service provider, using a first encrypted communication, and service provider device's public key to the selected client, using a second encrypted communication.

15. The method according to claim 14, wherein the at least one service provider devices provide services of interest to the at least one clients and the services comprise at least insurance, record keeping, banking, and retail.

16. The method according to claim 14, wherein the computing devices further comprise a plurality of point of sale devices in one to one correspondence with the respective one or more client devices.

17. The method according to claim 16, wherein the one or more client devices communicate with the plurality of point of sale devices via at least one of near field communication, QR code, and bar code.

18. The method according to claim 17, wherein the communication of the plurality of client devices and the respective plurality of point of sale devices includes receiving and sending client data, service provider data, requests and commands.

19. The method according to claim 16, wherein the at least one server communicates with the one or more client devices and with the plurality of point of sale devices.

20. The method according to claim 19, further comprising a step of selecting different of the at least one client and the at least one service provider, respectively.

21. The method according to claim 14, wherein the one or more service provider devices accessing the at least one data store only from a previously registered IP address.

22. The method according to claim 14, wherein each of the one or more service provider devices alone has rights to access and change the client data provided by the one or more service provider devices.

23. The method according to claim 14, further comprising a step of: cooperating with the one or more client devices.

24. The method according to claim 23 further comprising a step of changing a data store to client connection, data store to service provider connection, a client connection, and service provider connection.

25. The method according to claim, 22 wherein the server is operable to compare the public data with the private data to assemble a single view for each of the at least one clients, wherein all the private data relating to each client is assembled and displayed.

26. The method according to claim 25, wherein the service provider data includes public service provider data and private service provider data and the private service provider data is received from each of the plurality of one or more service provider devices.

* * * * *